United States Patent
Dahm et al.

(10) Patent No.: US 11,011,050 B2
(45) Date of Patent: *May 18, 2021

(54) DETECTING AND TRACKING OF THREATS IN A PHYSICAL SPACE

(71) Applicant: Dahm Endeavor LLC

(72) Inventors: Matthew Vincent Dahm, Monroe, MI (US); Kevin Wayne Dahm, II, Monroe, MI (US); Jeanmarie Dahm, Monroe, MI (US); Kevin Wayne Dahm, Monroe, MI (US)

(73) Assignee: Dahm Endeavor LLC, Monroe, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,609

(22) Filed: Jun. 30, 2020

(65) Prior Publication Data

US 2021/0043067 A1 Feb. 11, 2021

Related U.S. Application Data

(63) Continuation of application No. 16/536,126, filed on Aug. 8, 2019, now Pat. No. 10,789,831.

(51) Int. Cl.
| | |
|---|---|
| *G01N 33/22* | (2006.01) |
| *G08B 27/00* | (2006.01) |
| *G08B 25/00* | (2006.01) |
| *G08B 17/08* | (2006.01) |
| *G08B 5/22* | (2006.01) |
| *G08B 17/12* | (2006.01) |
| *H04W 4/90* | (2018.01) |
| *G08B 5/38* | (2006.01) |

(52) U.S. Cl.
CPC ......... *G08B 27/001* (2013.01); *G08B 5/223* (2013.01); *G08B 17/08* (2013.01); *G08B 17/12* (2013.01); *G08B 25/00* (2013.01); *H04W 4/90* (2018.02); *G08B 5/38* (2013.01)

(58) Field of Classification Search
CPC ...... G08B 27/001; G08B 5/223; G08B 17/08; G08B 17/12; G08B 25/00; G08B 5/38; H04W 4/90
See application file for complete search history.

(56) References Cited

U.S. PATENT DOCUMENTS

| | | | | |
|---|---|---|---|---|
| 5,973,998 | A | * 10/1999 | Showen | ............... G01S 5/0036 367/124 |
| 9,830,932 | B1 | * 11/2017 | Gunderson | ............. H04M 1/82 |
| 2006/0114749 | A1 | * 6/2006 | Baxter | ...................... G01S 5/22 367/128 |
| 2007/0045243 | A1 | * 3/2007 | Sinha | ..................... B82Y 15/00 219/121.43 |
| 2008/0084788 | A1 | * 4/2008 | Showen | ................... G01S 5/28 367/127 |

(Continued)

*Primary Examiner* — Munear T Akki
(74) *Attorney, Agent, or Firm* — Carr & Ferrell LLP (57) ABSTRACT

Active shooters are becoming a common threat in public areas. Detection and analysis of a gunshot in a public area can aid administrative and first responder personnel in determining that a gun has been fired and in stopping the threat quickly. Embodiments of the present disclosure are directed to solutions for detecting and analyzing gunshots and other threats, and transmitting that information to administrative personnel and first responders.

19 Claims, 7 Drawing Sheets

(56) References Cited

U.S. PATENT DOCUMENTS

| | | | |
|---|---|---|---|
| 2013/0043130 A1* | 2/2013 | Lednev | G01N 21/65 |
| | | | 204/451 |
| 2014/0269199 A1* | 9/2014 | Weldon | G01S 5/18 |
| | | | 367/124 |
| 2014/0361886 A1* | 12/2014 | Cowdry | G08B 13/1672 |
| | | | 340/522 |
| 2015/0070166 A1* | 3/2015 | Boyden | G08B 13/1672 |
| | | | 340/540 |
| 2016/0209390 A1* | 7/2016 | Overcast | G01N 33/227 |
| 2016/0232774 A1* | 8/2016 | Noland | G08B 21/0438 |
| 2017/0153180 A1* | 6/2017 | Basu | C07D 495/14 |

* cited by examiner

DETECTING AND TRACKING OF THREATS IN A PHYSICAL SPACE

CROSS REFERENCE TO RELATED APPLICATIONS

This application is a Continuation of, and claims the priority benefit of, U.S. application Ser. No. 16/536,126 filed on Aug. 8, 2019. The disclosure of the above-referenced application is incorporated herein for all purposes.

FIELD OF THE INVENTION

The present disclosure relates to the detection of gunshots in a physical space, parking lot, or surrounding property and transmitting information about the gunshot to administrative personnel and first responders.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In an embodiment, the present technology is directed to a system comprising: a wireless or wired communication network; a plurality of sensors in a physical space, each of the plurality of sensors configured to detect particulate matter in the air and/or other substances that indicate that there is a current threat to the safety of the occupants of the physical space; an interactive electronic map for the physical space with a known marked location for each of the plurality of sensors; and a processor configured to execute instructions to: receive information from the plurality of sensors regarding the matter that is detected; determine whether the amount of the matter has significantly increased; determine whether the increase in the matter is likely due to a gunshot, accelerant or a fire and transmit the probability of the threat in the physical space to an administrative user, first responder, central dispatch or a user computing device for one or more of these groups.

Other features, examples, and embodiments are described below.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown as block diagram form only in order to avoid obscuring the disclosure.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

The present disclosure pertains to detecting gunshots and then aggregating that information to help law enforcement and administrative personnel stop an active shooter situation. Active shooters are a real threat to schools and other public areas. Active shooters are more deadly the longer they are active before they are apprehended. Thus, it is in the public's best interest to apprehend an active shooter as quickly as possible.

The present disclosure pertains to a particulate sensor for detecting a gunshot. The particulate sensor is integrated with a computer and a wired or wireless device that can transmit information about a gunshot to administrative personnel, central dispatch, and first responders. The information about the gunshot is also displayed on an electronic interactive map that can help administrative personnel, central dispatch, and first responders locate where the gunshot was fired and in which direction the active shooter may be moving.

The present disclosure relates to detecting a gunshot in a physical space. The physical space can be any enclosed space such as a single room space, multi room space, single story building or multiple story building. The physical space can also be any unenclosed space, such as a parking lot, park, recreational area, etc. By way of non-limiting example, the physical space can be a room, office building, restaurant, residence, school, recreation center, etc. The physical space may further have at least one wireless communication network for wireless-enabled devices to communicate with one another and with the Internet.

According to another embodiment, the physical space may be wired instead of wireless. In this embodiment, the particulate sensor device would have a wired connection. The wired connection would provide for wired devices to communicate with one another and with the Internet. In one embodiment, the particle sensor devices are wired using Power over Ethernet (PoE).

The present disclosure relates to detecting a gunshot and transmitting information about the gunshot to administrative personnel and first responders. Administrative personnel, a building administrator, or an administrative user can be any person who is designated to have access to the system in an administrative capacity. First responders can be any of law enforcement, central dispatch, fire, or medical personnel.

As referred to herein, a wireless-enabled device can be any device capable of communicating over any type of wireless network. For example, a wireless-enabled device may comprise a smartphone, tablet, smartwatch, laptop computer, Nest or other smart thermometer, voice activated digital assistant (like Amazon Echo, Google Home), network printer, 2-way radio, router, smart TV, smart appliance, automobile, drone, or any other item with wireless communication capability. In various embodiments, a wireless-enabled device can communicate over at least one type of wireless network, such as Wi-Fi network, Bluetooth, RFID, radio, Cellular network, etc.

Figure 1:
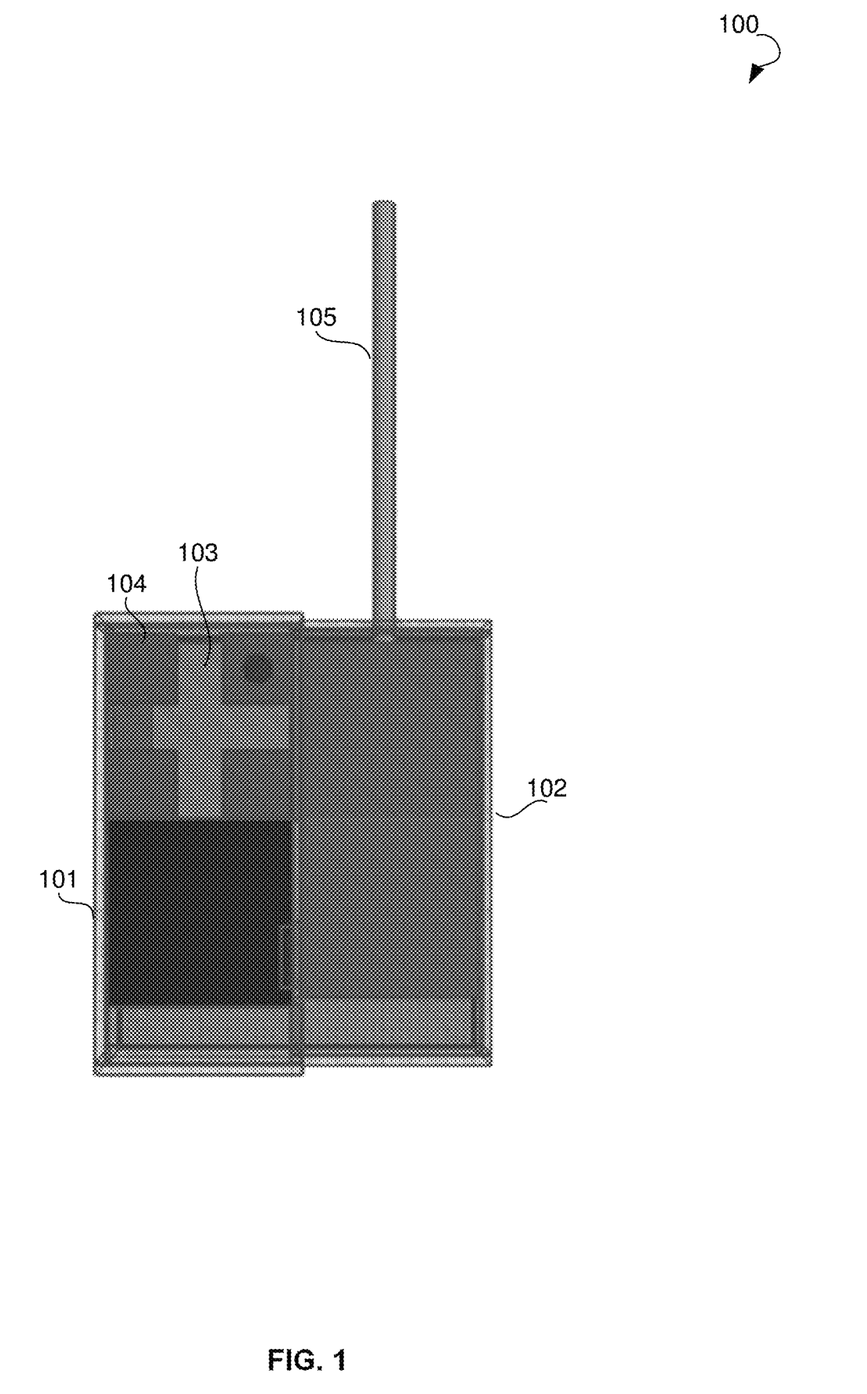
FIG. 1 depicts a particulate sensor device with a particulate sensor, other sensors, computer, Wi-Fi adapter or Power over Ethernet (PoE) and antenna or wired adapter.

FIG. 1 illustrates one embodiment of the particulate sensor device 100. A particulate sensor 101, a small computer (e.g. raspberry pi) 103, a Wi-Fi adapter 102, an antenna 105, and additional sensor(s) 104 may all form a part of the particulate sensor device 100. The particulate sensor 101 detects the gunshot, then the computer 103 sends a signal through the Wi-Fi adapter 102 and antenna 105 to a server 304 (as shown on FIG. 3). Additional sensor(s) 104 may include but are not limited to a gas sensor, a camera, an acoustic sensor, a smoke detector and/or a carbon monoxide detector.

Figure 2:
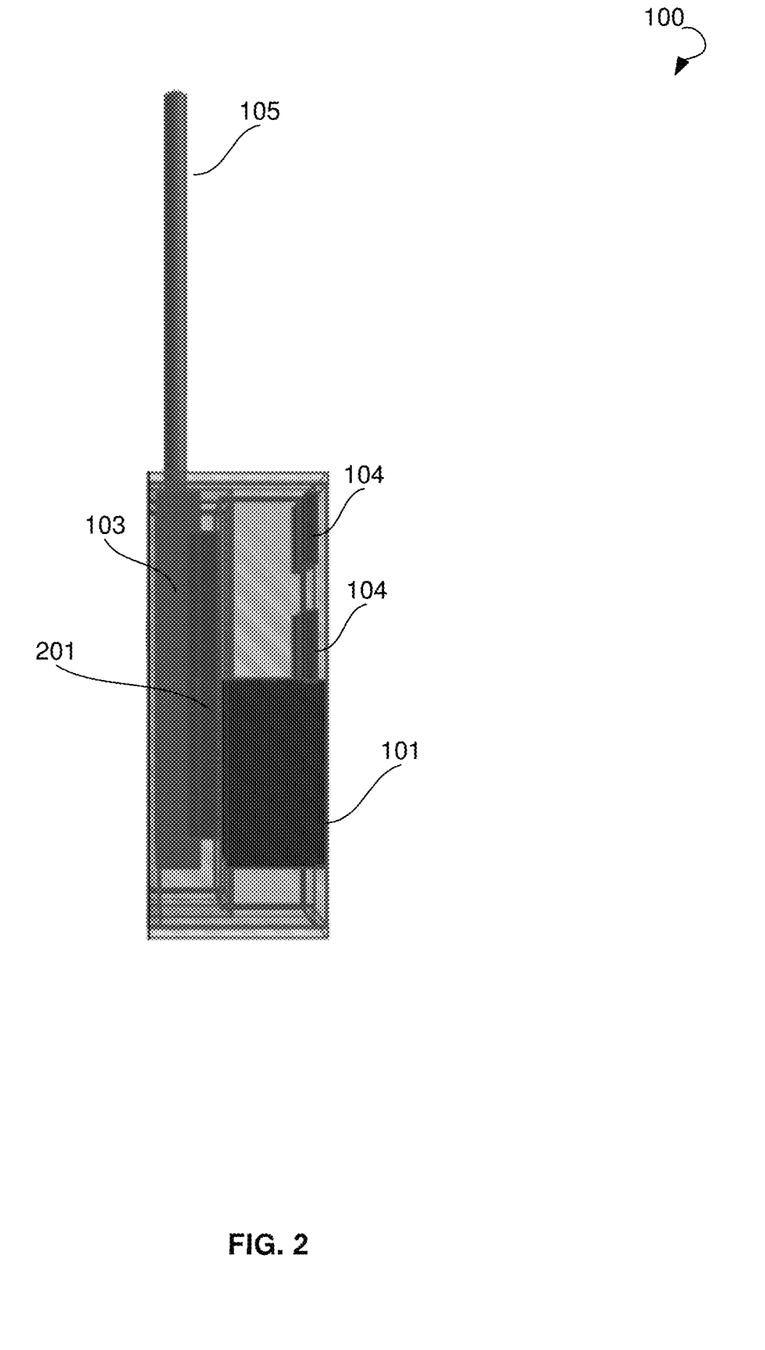
FIG. 2 depicts a cross section of the particulate sensor device.

FIG. 2 is a side view of the particulate sensor device 100. The side view shows the computer 103 positioned behind the sensors 101 and 104 according to one embodiment. The general purpose input output (GIPO) device 201 is located behind the particulate sensor 101 according to one embodiment.

In some embodiments, the particulate sensor 101 detects lead, barium, soot and other particulate matter in the air. When a gun is fired near a particulate sensor device 100, the particulate sensor 101 detects the increase in particulate matter in the air. When a gun is fired the amount of particulate matter in the air increases from, for example, less than 10 micro particles to greater than 100 micro particles.

In one embodiment, the delay between the shot being fired and the particulate sensor 101 registering the increase in particulate matter can take up to six seconds. In an enclosed area the particulate sensor 101 registers the shot within approximately one second. In a more open space there can be a longer delay for the gunshot to register, sometimes up to six seconds. In one embodiment, the particulate sensor 101 can detect when additional gunshots have been fired. The gunshots create a spike in particulate matter detected in the surrounding environment. Each additional gunshot creates a new spike in the amount of particulate matter detected by the particulate sensor 101.

Figure 3:
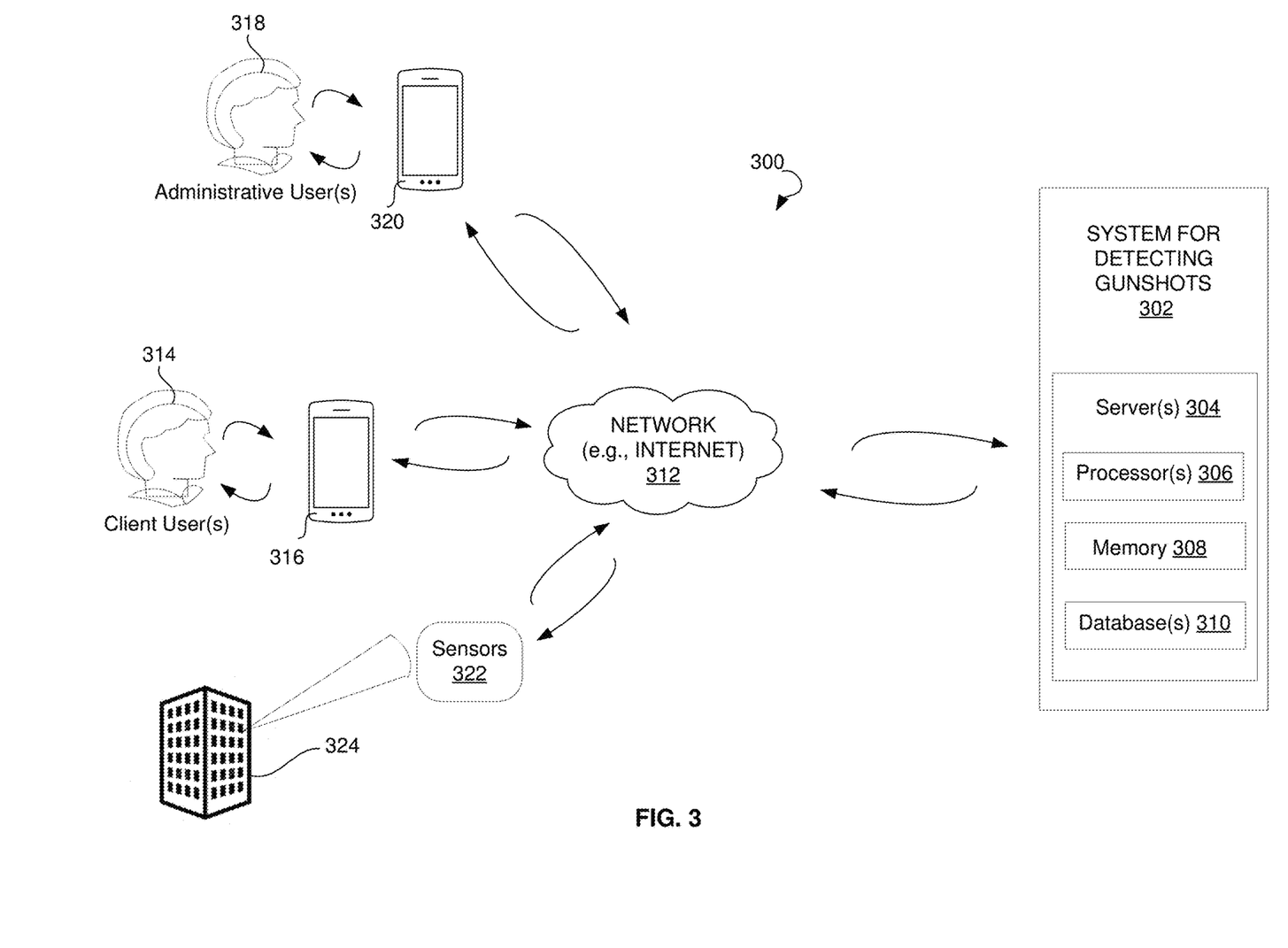
FIG. 3 illustrates an exemplary simplified environment for a system for detecting gunshots in a physical space.

FIG. 3 illustrates an exemplary simplified environment 300 for a system for detecting gunshots 302 in a physical space (also sometimes referred to herein as "system 302"). In exemplary embodiments, the system for detecting gunshots 302 is a server-based distributed software application, thus the system 302 may include a central component residing on a server 304 and one or more client applications residing on one or more user devices and communicating with the central component via the network 312. Users may communicate with the system 302 via a client application available through user devices.

System 302 may comprise software application(s) for receiving, processing, analyzing, and outputting data to and from sensors 322 and/or user devices. In exemplary embodiments, at least some components of system 302 operate on one or more cloud computing devices or servers. Server(s) 304 may comprise at least one processor 306, memory 308, and database 310.

Processor(s) 306 may be any suitable hardware processor for executing the software program on server(s) 304. Processor(s) 306 may include a programmable processor, such as a microcontroller, central processing unit (CPU), and so forth. In other embodiments, the processor(s) 306 may include an application-specific integrated circuit or programmable logic array, such as a field programmable gate array, designed to implement the functions performed by the system for detecting gunshots 302.

Memory 308 may comprise static and/or dynamic memory.

Database(s) 310 may be any data structure capable of containing information for use by the system 302. Database(s) 310 may include computer-readable instructions for execution by processor 306.

In various embodiments, the system for detecting gunshots 302 may be installed on a user computing device or may be provided as a cloud service residing in a cloud storage. The operations performed by the processor 306 and the database 310 are described in further detail herein.

System for detecting gunshots 302 may further be in communication with administrative user(s) 318, client users 314, and sensors 322. There may be additional components in communication with system 302 than those depicted in exemplary FIG. 3. For example, though not depicted in exemplary FIG. 3, system 302 may further be in communication with one or more emergency response services, such as central dispatch, a police department, a fire department, or an emergency medical service.

In various embodiments, administrative user(s) 318 may access data from system 302 on administrative user device 320, which is in communication with system 302 via network 312. Administrative user device 320 may be any computing device with a graphical user display and input mechanisms available to administrative user 318. Further, administrative user device 320 may be a wireless-enabled device, as defined here. In addition, system 302 may send alerts to administrative user device 320 in the form of a pop-up alert, text message, email message, phone call, or any other means of communicating with administrative user device 320.

Client user(s) 314 may also access data from system 302 on client user device 316, which is in communication with system 302 via network 312. Client user device 316 may be any computing device with a graphical user display and input mechanisms available to client user 314. Further, client user device 316 may be a wireless-enabled device, as defined here. In exemplary embodiments, system 302 may send alerts to client user device 316 in the form of a pop-up alert, text message, email message, phone call, or any other means of communicating with client user device 316.

As discussed herein, building 324 may be any physical space with a plurality of sensors 322 installed therein. Sensors 322 may be in communication with system 302 via network 312. Sensors 322 may be any type of sensor, such as particulate sensor devices 100 described in reference to FIG. 1 herein.

The network 312 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection.

Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 312 can further include or interface with any one or more of an RS-232 serial connection, an IEEE-1394 (FireWire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking.

The network 312 may be a network of data processing nodes that are interconnected for the purpose of data communication. The network 312 may include any suitable number and type of devices (e.g., routers and switches) for forwarding commands, content, requests, and/or responses between each system 302 and connected devices.

Figure 4:
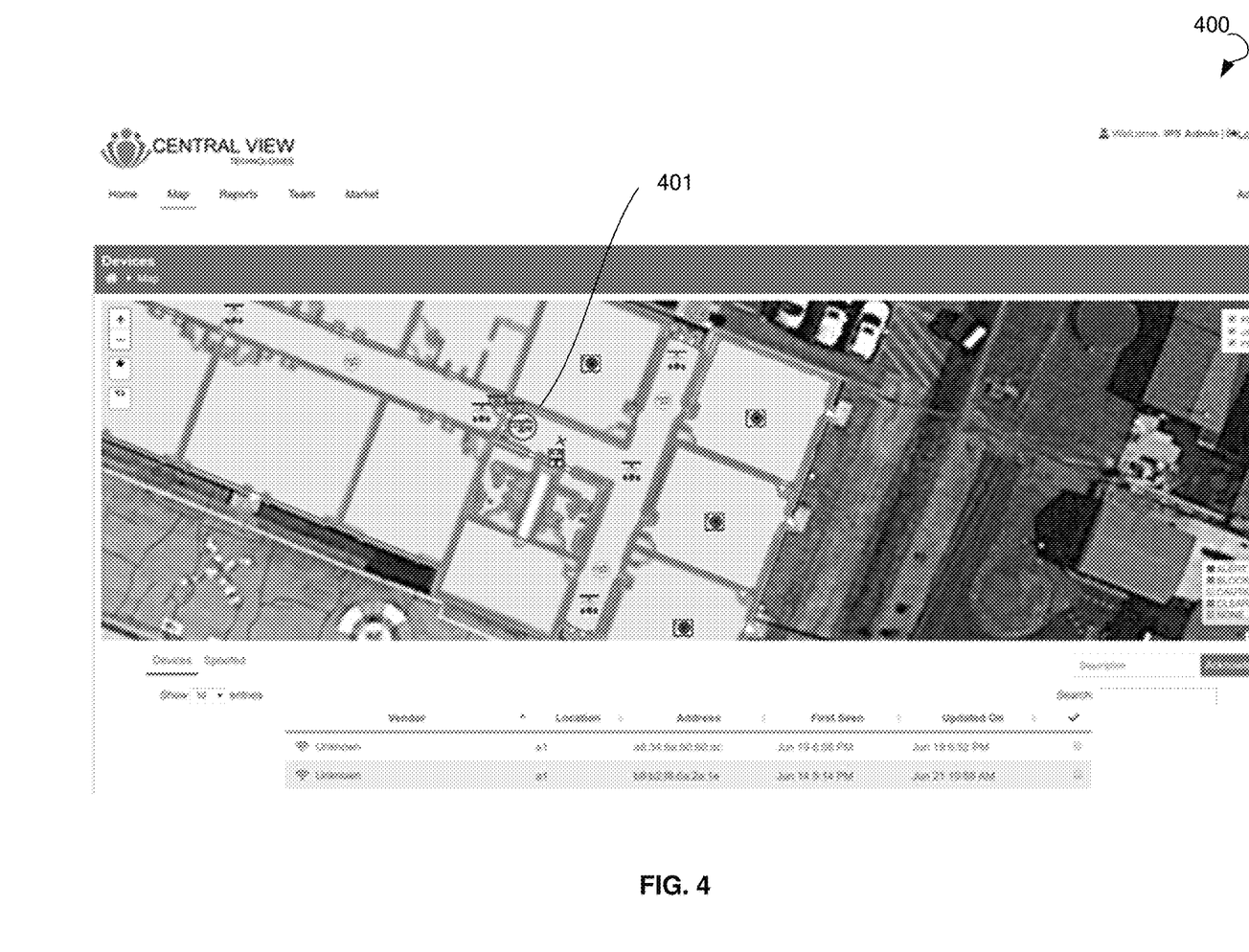
FIG. 4 depicts a graphical user interface for displaying the location of sensors in a building and their status.

FIG. 4 is an example of an electronic interactive map 400 for displaying data received from the particulate sensor devices 100. The electronic interactive map 400 can communicate the data received from the particulate sensor devices 100 to administrators and first responders. An icon 401 is used to indicate the current status of the alarm.

The present disclosure is directed to detecting a gunshot or other current threat within a physical space. In exemplary embodiments, an electronic interactive map 400 is generated of the physical space. This electronic interactive map 400 may be based on a floor plan or other architectural diagram of the space.

Also located on the electronic interactive map 400 is the location of each of a plurality of sensors that are installed in the physical space. The sensors (sensor devices 100 on FIG. 1 and sensors 322 on FIG. 3) may be installed on walls, ceiling, floor, or on other movable and non-movable objects within the space. As would be understood by persons of ordinary skill in the art, there can be any number of sensors in a space, depending on the size of the space. Typically, there may be between 3 and 100 sensors present.

In some embodiments, after a gun has been fired the particulate sensor 101 detects the increase in particulate matter. The spike in particulate matter is then processed by the computer 103 and is transmitted over the network 312 to the system 302. The system 302 performs various functions such as changing the icon 401 for the particulate sensor 101 on the electronic interactive map 400 from clear to active, showing that a shot has been fired, and sending out an alert to administrative personnel and first responders.

The amount of particulate matter detected by the particulate sensor 101 is dependent on the size and caliber of the weapon. In one embodiment, the particulate sensor 101 can detect how much particulate matter is released and the system 302 can correlate that information with a database that contains information regarding the amount of particulate matter released by particular guns. By using this comparison, the type of gun can then be determined. Using this method the particulate sensor 101 can also detect if there are multiple types of guns being discharged, and what types of guns are being used.

In some embodiments, one of the additional sensors 104 is a gas sensor. The gas sensor detects combustible gases such as, but not limited to methane, propane, butane, and carbon monoxide. The gas sensor would have lower sensitivity to alcohol and smoke.

A gas sensor is useful in detecting an accelerant before it is ignited. An accelerant can be any form of combustible gas or other combustible material. A potential attacker may attempt to light propane tanks or other sources of combustible gas. The ignition of the combustible gas could create an explosion that might injure those in the physical space and/or distract first responders from finding an active shooter.

In some embodiments, the particulate sensor 101 can detect if there is a fire burning in a particular area of the building. The system 302 can connect to existing smoke detectors and carbon monoxide detectors so that a general alert is sounded in addition to alerts sent through the system 302. The particulate sensor 101 detects the fire burning and then the particulate sensor device 100 and the system 302 alerts administrative personnel and first responders. The electronic interactive map 400 would display where the fire is located. Seeing the fire location on an electronic interactive map 400 could help administrative personnel to clear the right portions of the building and also help first responders to know in which area of the building the fire is located.

In some embodiments, one of the additional sensors 104 is a video or surveillance camera. The video camera can either record at all times or in short bursts. In some embodiments the video camera begins recording after one of the sensors has been triggered.

In some embodiments, after the gunshot has been detected the system 302 can turn on nearby surveillance cameras. Other potential functions that the system 302 could perform would be to turn on additional sensor(s) 104 like an acoustic sensor. An acoustic sensor would have the ability to detect a gunshot by sound waves. In one embodiment, an acoustic sensor could be used in addition to the particulate sensor 101 to help triangulate the location of the gunshot. In one embodiment, the system 302 could then communicate with an electronic interactive map 400. The electronic interactive map 400 could display the location of the particulate sensor device 100 where the gunshot was detected.

In some embodiments, multiple particulate sensor devices 100 are installed in a space. Using multiple particulate sensor devices 100 the direction of the bullet can be determined based on the varying amounts of particulate matter detected. For example, if there are three particulate sensor devices 100 in a hallway and the farthest south particulate sensor device 100 detects the largest amount of particulate matter, then the central particulate sensor device 100 picks up slightly less particulate matter, and the farthest north particulate sensor device 100 picks up the least particulate matter, then the system 302 can determine that the gun was discharged on the south end of the hallway and aimed to the north.

In some embodiments, a shooter may be firing a gun and then moving on to another location and firing the gun again. If there are multiple particulate sensor devices 100 located throughout the space, then the particulate sensor devices 100 could detect the gunshots in each location and that information could be transmitted to the system 302 which could transmit the information to the electronic interactive map 400. Then first responders could see where earlier shots were fired and more recent shots were fired. Using this information a first responder could extrapolate which direction a shooter is moving in the physical space.

In some embodiments, the electronic interactive map 400 displays the threat level after a gun has been fired. A first level would indicate that a gun has been fired in the vicinity very recently. A second level would be an intermediate level indicating that a gun was fired in that vicinity but some time has gone by since the gun was fired. A third level would indicate that a gun was fired some time ago but the area has now been cleared by law enforcement. A fourth level would indicate that a shot has not been fired in the vicinity of that particulate sensor device 100.

In some embodiments, a first responder or a person with administrative access could edit the electronic interactive map 400 to mark locations where a gunshot was previously detected as cleared. A location is clear or cleared when an individual whether a first responder, administrative personnel or another, has physically checked the location to determine if there is still an active threat, and has determined that there is no longer an active threat in that physical space. Having areas that are marked clear would help medical personnel to know whether a particular location is safe for them to enter. It is important for medical personnel to know whether or not a location is safe to enter because delayed medical attention could cause victims greater harm, including death. Also, medical personnel do not want to interfere with law enforcement and should not be placed in undue danger.

In some embodiments, there may be authorized guns within a facility that are tracked using wireless means. The guns would have a wireless tracking device that a sensor 322 could detect. In the event a firearm is discharged, the location of the guns with wireless tracking could be compared to the location where a gunshot is detected by the particulate sensor 101. Comparing gun locations with the locations of gunshots could help administrative and law enforcement personnel determine if the gunshot is coming from a known source by an authorized individual or not.

In some embodiments, the system 302 takes a time stamp from the particulate sensor device 100 that detected the gunshot. The time stamp records the time that the gunshot was detected by the particulate sensor 101. Then the system 302 finds the nearest surveillance camera(s) and takes a recorded video clip of the time preceding the gunshot (for example 30 seconds to two minutes before the shot was fired). Then the system 302 transmits the video clip to administrative personnel and first responders. The video clip could also be accessed on the electronic interactive map 400.

In addition, if the surveillance cameras are on continuously a user could move backwards through camera footage and other data to determine what happened prior to the gunshot. This would help first responders and administrative personnel to identify the individual that is responsible for firing the gun.

A particulate sensor 101 is superior to other sensors such as an acoustic sensor because it is less likely to be triggered by a false alarm. A gunshot or a fire would trigger an alarm from the particulate sensor 101 and both are potentially life threatening events. An acoustic sensor may be triggered by someone clapping loudly or other loud noises. This would trigger a false alarm since not all loud noises are indicative of a threat. A particulate sensor 101 on the other hand, will typically only be triggered by an event that is critical to the safety of those in the physical space. The system 302 could differentiate between a gunshot and fire and alert the correct personnel for each event.

According to some embodiments, the particulate sensor 101 can be set to the normal settings for a room. For example, a welding shop would have a higher baseline amount of particulate matter in the air than a school classroom. The baseline for the particulate sensor 101 could be set so that the alarm does not trigger at normal levels of particulate matter for the room where the particulate sensor 101 is located.

According to some embodiments, the system 302 after detection of a gunshot could lock doors in a building, potentially limiting a shooter's access to other spaces. The system 302 could also send out SMS alerts to nearby cellphones. Letting cellphone users know where the shot was fired. This could help users to determine whether they should evacuate or shelter in place.

The particulate sensor devices 100 are approximately 2 inches by 2 inches by 2.5 inches. Particulate sensors can be disguised as other common items in a room, such as a thermostat.

Figure 5:
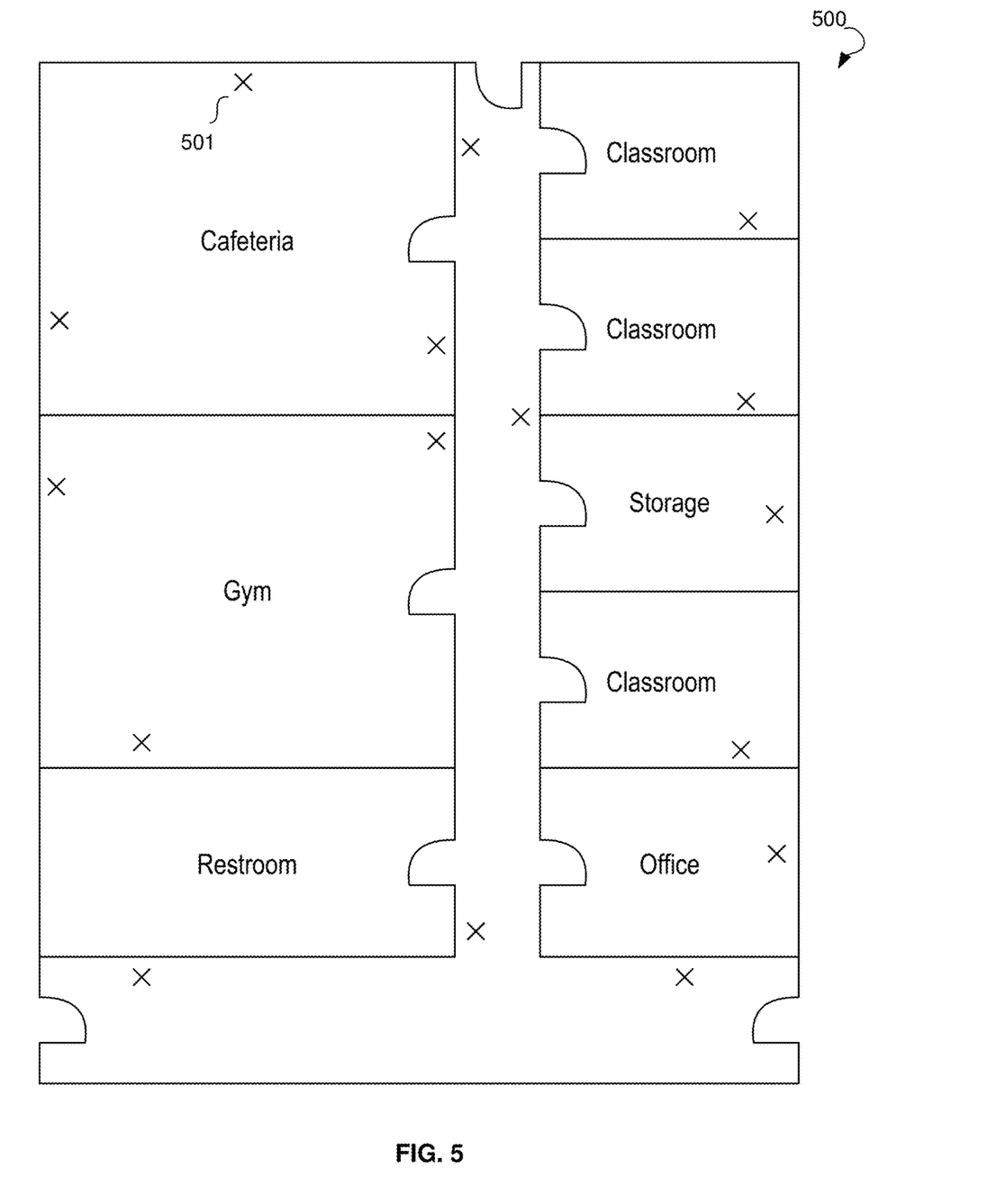
FIG. 5 depicts an exemplary map of a physical space that is a school.

FIG. 5 shows a school 500 with the locations of particulate sensor devices 501 (100 on FIG. 1), which are also referred to herein as simply "devices 501". As shown by each "X" on the Figure, the devices 501 are distributed throughout the building. A gunshot can be detected wherever it is discharged in the building if there are devices 501 in every room and hallway. The devices 501 may be placed anywhere in the classroom, such as on walls, ceilings, floors, or attached to movable objects.

Any of the sensors discussed herein, such as particulate sensor devices 100 of FIG. 1 or sensors 322 of FIG. 3, may have additional environmental sensing capabilities. For example, the particulate sensors 101 may additionally have any one or more of a sensor for sensing for volatile gases to detect a gas leak, time of flight sensor, vibration detection, sound localization sensing, heat sensing, humidity sensing, microphone, and/or camera for capturing still and moving images. With the additional information gleaned from the environmental sensing capabilities, the identity of the shooter, type of weapon or other useful information can be detected.

For example, a sensor 104 on the particulate sensor device 100 may detect that a loud sound is registered near where the particulate sensor 101 has detected a gunshot with periodic loud sounds detected near it. This may suggest to system 302 that there is an active shooter moving through the physical space and a person needs to carefully approach.

In other embodiments, a microphone on a particulate sensor device 100 can determine where a sound originated from (i.e., right side or left side of the device). It can further determine that a sound is getting closer or farther away from a known access point in the physical space.

In some embodiments, one or more additional environmental sensors on the particulate sensor device 100 may be triggered on or off with trigger events. In other embodiments, one or more of the environmental sensors are always on, or may be manually turned on or off by an administrative user. In one exemplary embodiment, a sound detected over a certain threshold decibel level may trigger the activation of a camera on the particulate sensor device 100 and the camera may record for a predetermined amount of time, or until a second trigger condition is met. An administrative user 318 may view the camera feed in real-time, or after the fact from system 302 to determine the source of the unusually loud sound and any action required. In exemplary embodiments, the camera can be integrated with a security system already present in the physical space.

Utilizing information gleaned from the environmental sensors with information gleaned from the particulate sensor device 100, a degree of vulnerability in a physical space can be assessed with more granularity. In combination with an electronic interactive map 400 of a physical space, sound sensors and profiles can determine screaming, running, loud noises and then quiet, to determine a likely threat to life for persons inside the physical space.

Data retrieved from sensors (such as sensor devices 100 of FIG. 1 or sensors 322 of FIG. 3) may be stored by the system 302 for a predetermined period of time, and then moved to cold storage. In exemplary embodiments, 1 week of data may be kept by system 302 before it is moved to cold storage.

Figure 6:
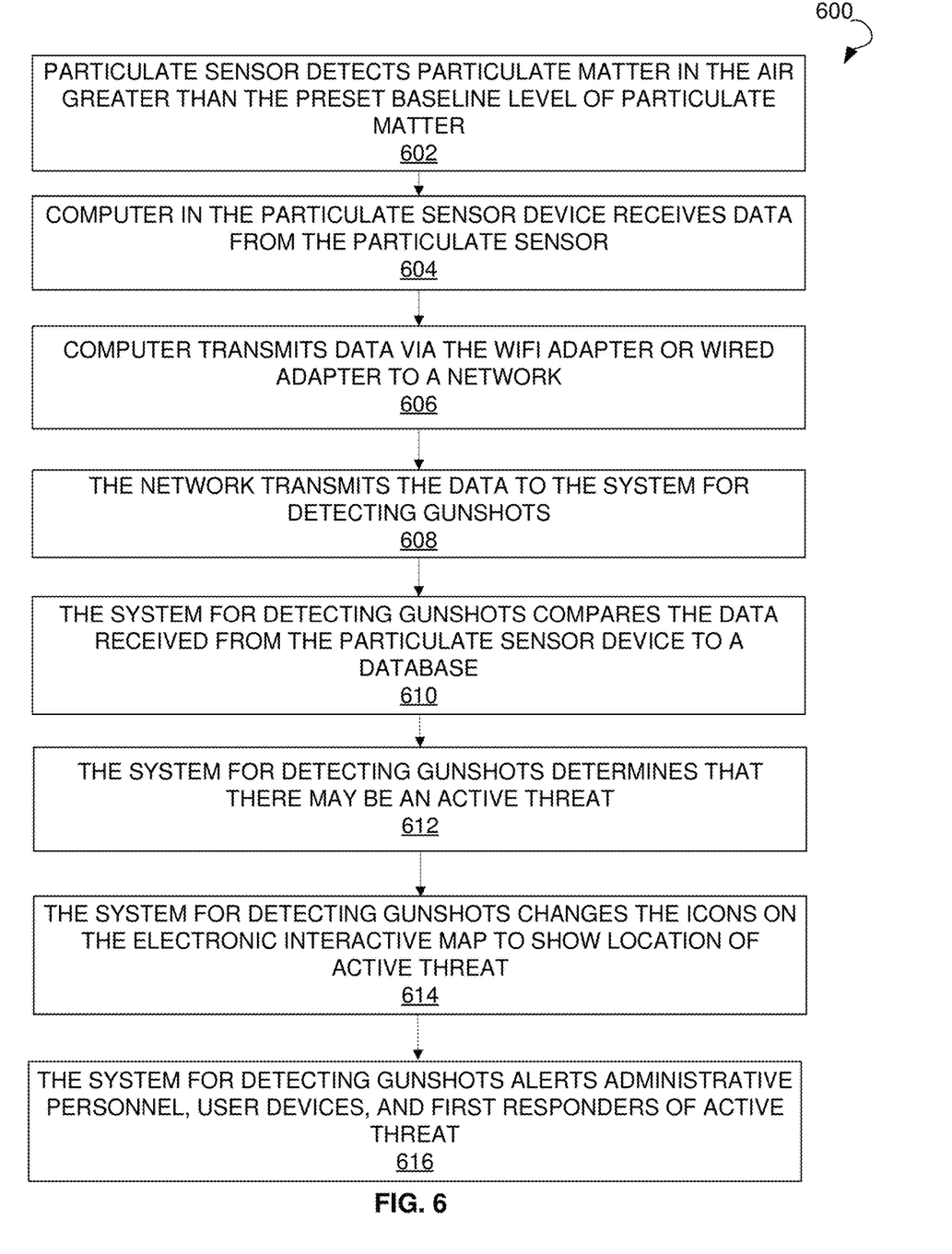
FIG. 6 is a flow chart illustrating a method for determining whether a gun has been discharged, in accordance with an example embodiment.

FIG. 6 is a flow chart illustrating a method 600 for determining whether a gun has been discharged, in accordance with certain embodiments. In some embodiments, the operations may be combined, performed in parallel, or performed in a different order. The method 600 may also include additional or fewer operations than those illustrated. The method 600 may be performed by processing logic that may comprise hardware (e.g., decision making logic, dedicated logic, programmable logic, and microcode), software (such as software run on a general-purpose computer system or a dedicated machine), or a combination of both.

The method 600 may commence with the particulate sensor 101 detecting particulate matter in the air greater than a baseline level of particulate matter at block 602. The baseline level of particulate matter can be set to a predetermined level based on the typical use of the room where the particulate sensor device 100 is located. The method 600 may continue with one of the additional sensor(s) 104 detecting an event that indicates that there is an active threat.

The method 600 may further include the computer 103 in the particulate sensor device 100 receiving data from the particulate sensor 101 or another of sensor(s) 104, as shown by block 604. The method 600 may continue with the computer transmitting the data via the Wi-Fi adapter 102 or a wired adapter to a network 312, as shown by block 606.

The method 600 may further include the network 312 transmitting the data to the system for detecting gunshots 302, as shown by block 608. The method 600 may continue with the system for detecting gunshots 302 comparing the data received from the particulate sensor device 100 or an additional sensor(s) 104 to a database at block 610. In one embodiment, the database can include information that can be used to correlate particulate matter observed with particulate matter that is released from different sizes or calibers of guns. In some embodiments, the database can also include information that can be used to correlate particulate matter observed with particulate matter that is released when a gun is a certain distance away from the particulate sensor 101. In some embodiments, the database can include information that can be used to correlate particulate matter observed with particulate matter that is released for each additional gunshot. In some embodiments, the database may include information about levels of particulate matter when there is a fire burning nearby. In some embodiments, the database may include information about levels of combustible gas when an accelerant is in the air.

The method 600 may further include the system for detecting gunshots 302 determining that there may be an active threat at block 612. In exemplary embodiments, an active threat may be concluded if the system 302 determines that there has been a gunshot, there is a fire or that there is accelerant in the air. The method 600 may continue with the system for detecting gunshots 302 changing the icons 401 on the electronic interactive map 400 to show that there has been a gunshot, that there is a fire, that there is accelerant in the air, or that there is some other active threat in the physical space at block 614.

In one embodiment, the icons 401 could be changed to a different color or size or beacon at different speeds. In another embodiment, the icon 401 could also display new text indicating the type of threat. The type of threat could include, but is not limited to, one or multiple gunshots, fire, or accelerant in the air.

The method 600 may further include the system for detecting gunshots 302 alerting administrative personnel, user devices, and first responders that there has been a gunshot, a fire, or that there is accelerant in the air at block 616. In some embodiments, the alerts may be displayed on the electronic interactive map 400, or in the form of a pop-up alert, text message, email message, phone call, or any other means of communicating with first responders and administrative and user devices.

Figure 7:
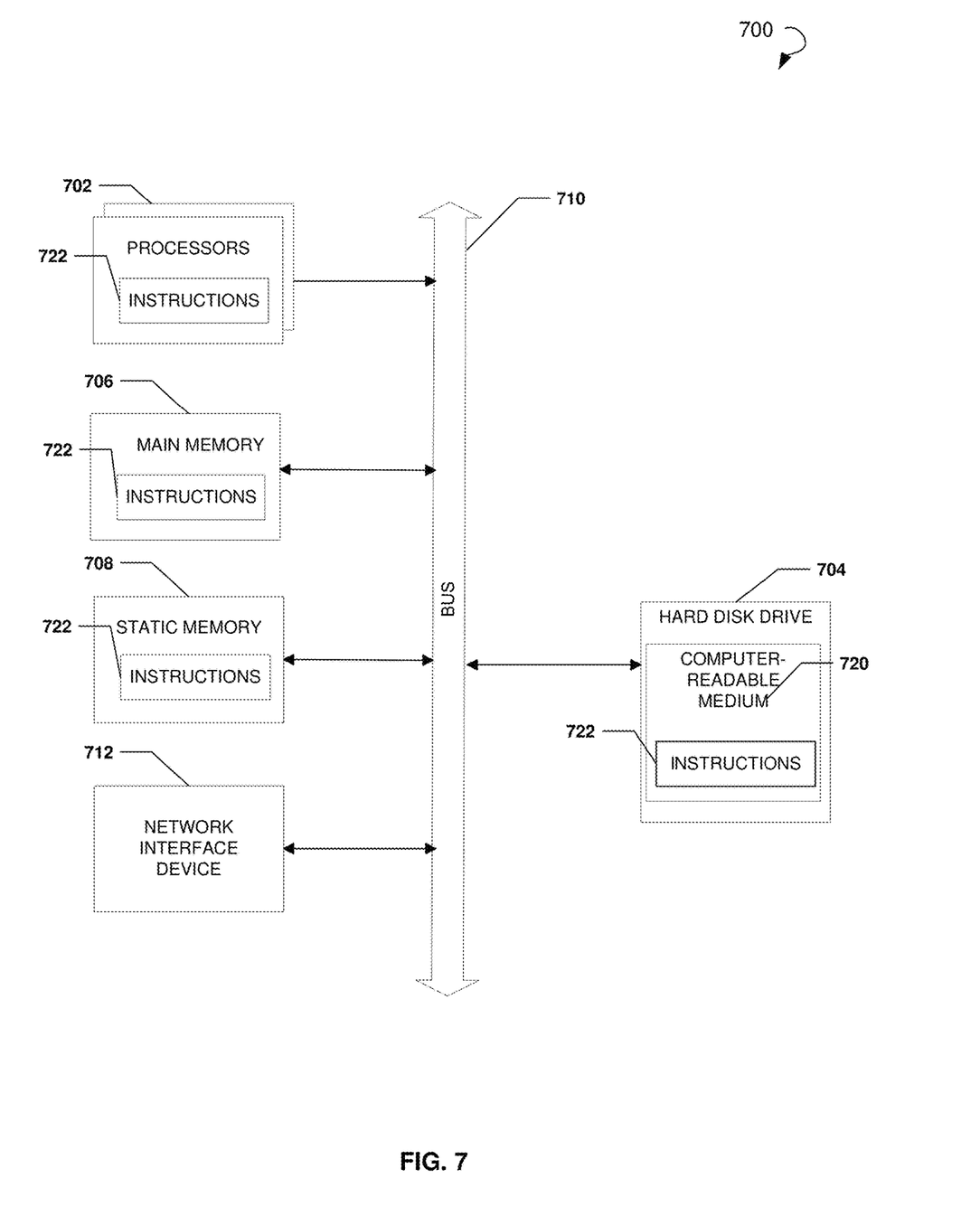
FIG. 7 is a simplified block diagram for a computing system, according to some embodiments.

Various embodiments of the present technology can be practiced with a local computer system, and/or a cloud-based system. FIG. 7 shows a diagrammatic representation of a computing device for a machine in the exemplary electronic form of a computer system 700, within which a set of instructions for causing the machine to perform any one or more of the methodologies discussed herein can be executed. Computer system 700 may be administrative user device, client user device, or any of the servers discussed herein.

In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702, a hard disk drive 704, a main memory 706 and a static memory 708, which communicate with each other via a bus 710. The computer system 700 may also include a network interface device 712. The hard disk drive 704 may include a computer-readable medium 720, which stores one or more sets of instructions 722 embodying or utilized by any one or more of the methodologies or functions described herein. The instructions 722 can also reside, completely or at least partially, within the main memory 706 and/or the static memory 708 and/or within the processors 702 during execution thereof by the computer system 700. The main memory 706, the static memory 708, and the processors 702 also constitute machine-readable media.

While the computer-readable medium 720 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, JavaScript, Go, or other compilers, assemblers, interpreters or other computer languages or platforms.

The processing for various embodiments may be implemented in software that is cloud-based. In some embodiments, the computer system 700 is implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN), a wide area network (WAN), a Metropolitan Area Network (MAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products, according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, systems and methods for detecting gunshots in a physical space are described herein. While various embodiments have been described, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the present technology should, therefore, be determined not with reference to the above description, but instead should be determined with reference to the appended claims along with their full scope of equivalents.

What is claimed is:

1. A method for detecting a gunshot in a physical space, the method comprising:
   receiving at a computing device in communication with a particulate sensor, that the particulate sensor located in a physical space has detected an increase in particulate matter above a predetermined threshold in the physical space;
   determining, by the computing device, that the detected increase in particulate matter is due to a gunshot;
   based on the determination, transmitting an indication about the gunshot from the computing device to an administrative user computing device, the indication comprising an identifier for the particulate sensor that detected the increase in particulate matter; and mapping by the administrative user computing device, the indication about the gunshot to an electronic interactive map of the physical space.

2. The method of claim 1, wherein the electronic interactive map of the physical space has an icon for each sensor and the icon changes color, size or flashes at variable speeds when a gunshot is detected.

3. The method of claim 1, wherein the electronic interactive map further displays a threat level for the physical space based at least in part on elapsed time since the determined gunshot.

4. The method of claim 1, further comprising: determining by the administrative user computing device, whether the gunshot is by an authorized individual based at least in part on a location of the gunshot depicted on the electronic interactive map of the physical space and known locations of authorized firearms depicted on the electronic interactive map.

5. The method of claim 1, wherein the computing device in communication with the particulate sensor can customize a baseline setting for the particulate sensor, based at least in part on the physical space.

6. The method of claim 1, further comprising:
   determining, by the computing device in communication with the particulate sensor, a type of gun that is likely to have produced the determined gunshot, based at least in part on an amount of particulate matter detected by the particulate sensor.

7. The method of claim 1, wherein the detected increase in particulate matter is at least an increase of 10 micro particles above a baseline particulate matter in the physical space.

8. The method of claim 1, wherein the physical space is a partially or fully enclosed space comprising at least one room.

9. The method of claim 1, wherein an administrative user is a building administrator, central dispatch or a first responder.

10. The method of claim 1, wherein the determining that the detected increase in particulate matter is likely due to a gunshot further comprises:
receiving, by the computing device in communication with the particulate sensor, a signal from at least one additional sensor; and
utilizing the received signal from the at least one additional sensor in combination with the received signal from the particulate sensor to determine a likely gunshot in the physical space.

11. The method of claim 1, further comprising:
determining, by the computing device, a direction of the likely gunshot based at least in part on received signals from a plurality of sensors in the physical space.

12. A system comprising:
at least one particulate sensor in a physical space, the at least one particulate sensor configured to detect an increase in ambient particulate matter that is above a predetermined threshold in the physical space;
a communication network;
an interactive electronic map for the physical space displayed on an administrative computing device with a known marked location for each of the sensors; and
a processor configured to execute instructions to: receive information from the at least one particulate sensor regarding the detected change in ambient particulate matter in the physical space;
determine the detected change in ambient particulate matter in the physical space is due to a physical threat which includes at least one of a gunshot, explosion, or a fire; and
transmit information regarding the physical threat detected in the physical space to the administrative user computing device.

13. The system of claim 12, wherein the sensor is configured to detect particulate matter having a diameter of less than 2.5 micrometers.

14. The system of claim 12, wherein the physical space is a partially or fully enclosed space comprising at least one room.

15. The system of claim 12, wherein an administrative user is a building administrator, central dispatch, or a first responder.

16. The system of claim 12, wherein the transmitting information regarding the physical threat detected in the physical space to an administrative user computing device further comprises mapping a received signal from the at least one particulate sensor to its location on the electronic interactive map of the physical space.

17. The system of claim 12, wherein the electronic interactive map of the physical space has an icon for each sensor and the icon changes color, size or flashes at variable speeds when a physical threat is detected by the sensor.

18. The system of claim 12, wherein the administrative user computing device transmits the location of the physical threat to first responders.

19. The system of claim 12, wherein the processor is configured to customize a baseline setting for the particulate sensor, based at least in part on the physical space.

* * * * *